US012766647B2

(12) United States Patent
Lee et al.

(10) Patent No.: US 12,766,647 B2
(45) Date of Patent: Oct. 20, 2026

(54) APPARATUS FOR PREVENTING WELDING DISTORTION, AND METHOD FOR WELDING PIPE AND FLANGE USING THE SAME

(71) Applicant: POSCO Co., Ltd, Pohang-si (KR)

(72) Inventors: Jae-Yik Lee, Incheon (KR); Kyu-Tae Han, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 796 days.

(21) Appl. No.: 18/032,286

(22) PCT Filed: Oct. 28, 2021

(86) PCT No.: PCT/KR2021/015333
§ 371 (c)(1),
(2) Date: Apr. 17, 2023

(87) PCT Pub. No.: WO2022/092863
PCT Pub. Date: May 5, 2022

(65) Prior Publication Data
US 2023/0390875 A1 Dec. 7, 2023

(30) Foreign Application Priority Data
Oct. 30, 2020 (KR) ........................ 10-2020-0143217

(51) Int. Cl.
*B23K 37/0536* (2025.01)
*B23K 9/028* (2006.01)
(Continued)

(52) U.S. Cl.
CPC ........ *B23K 37/0536* (2013.01); *B23K 9/0282* (2013.01); *B23K 31/003* (2013.01); *B23K 2101/06* (2018.08)

(58) Field of Classification Search
CPC .............. B23K 37/0536; B23K 9/0282; B23K 31/003; B23K 2101/06; B23K 9/32;
(Continued)

(56) References Cited

U.S. PATENT DOCUMENTS 5,082,166 A 1/1992 Matsuo et al.
5,706,863 A * 1/1998 Matherne .............. B23K 31/02
138/103
2021/0053154 A1* 2/2021 Schmit .................. B23K 26/21

FOREIGN PATENT DOCUMENTS

CN 201579556 U 9/2010
CN 204673159 U 9/2015
(Continued)

OTHER PUBLICATIONS

Extended European Search Report dated Apr. 9, 2024 issued in European Patent Application No. 21886857.8.
(Continued)

*Primary Examiner* — Robert G Bachner
(74) *Attorney, Agent, or Firm* — Morgan Lewis & Bockius LLP

(57) ABSTRACT

The present invention relates to an apparatus for preventing welding distortion and a method for welding a pipe and a flange using same, the apparatus being capable of effectively reducing welding distortion of a flange, which occurs during welding with a pipe and improving economic efficiency and productivity. The apparatus for preventing the welding distortion comprises: at least one counterweight which is arranged to be in contact with one side of a flange that is to be welded to a pipe, and has a hollow portion therein; and a fastening tool which fixes the counterweight to the flange, wherein the hollow portion of the counterweight may accommodate a refrigerant.

11 Claims, 5 Drawing Sheets

(51) Int. Cl.
*B23K 31/00* (2006.01)
*B23K 101/06* (2006.01)

(58) Field of Classification Search
CPC ... B23K 11/002; B23K 11/0935; B23K 11/36; B23K 37/003; B23K 2101/04
See application file for complete search history.

(56) References Cited

FOREIGN PATENT DOCUMENTS

| | | | |
|---|---|---|---|
| CN | 207139168 | U | 3/2018 |
| CN | 110666303 | A | 1/2020 |
| CN | 110666311 | A | 1/2020 |
| EP | 2676758 | A1 | 12/2013 |
| JP | 2005-088048 | A | 4/2005 |
| JP | 2019-000852 | A | 1/2019 |
| KR | 20-1991-0015230 | U | 9/1991 |
| KR | 10-2011-0088729 | A | 8/2011 |
| KR | 10-1388882 | B1 | 4/2014 |
| KR | 10-2015-0102321 | A | 9/2015 |
| KR | 10-2017-0116349 | A | 10/2017 |
| KR | 10-2020-0046673 | A | 5/2020 |
| KR | 10-2020-0116956 | A | 10/2020 |
| WO | 2016/002171 | A1 | 1/2016 |

OTHER PUBLICATIONS

Chinese Office Action dated Dec. 26, 2025 issued in Chinese Patent Application No. 202180073613.6 (with English translation).
International Search Report dated Jan. 12, 202, issued in International Patent Application No. PCT/KR2021/015333 (with English translation).

* cited by examiner

FIG. 5
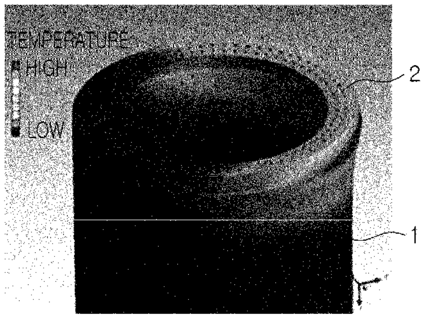
FIG. 5A
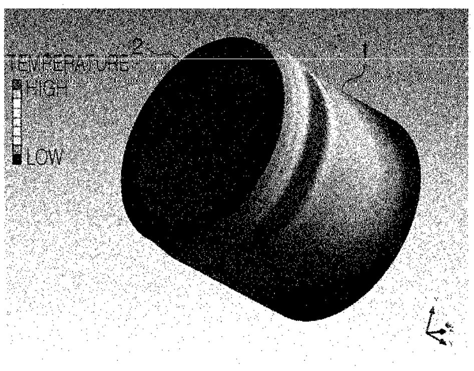
FIG. 5B

APPARATUS FOR PREVENTING WELDING DISTORTION, AND METHOD FOR WELDING PIPE AND FLANGE USING THE SAME

CROSS-REFERENCE OF RELATED APPLICATIONS

This application is the U.S. National Phase under 35 U.S.C. § 371 of International Patent Application No. PCT/KR2021/015333, filed on Oct. 28, 2021, which in turn claims the benefit of Korean Application No. 10-2020-0143217, filed on Oct. 30, 2020, the disclosures of which applications are incorporated by reference herein.

TECHNICAL FIELD

The present disclosure relates to an apparatus for preventing welding distortion, capable of effectively reducing welding distortion of a flange, occurring during welding with a pipe and a method for welding a pipe and a flange using the same.

BACKGROUND ART

For example, since a tower of a wind power generator supports heavy turbines and blades located in an upper portion thereof, structural stability should be secured. To this end, the tower has a structure in which a diameter decreases toward the upper portion thereof. As capacity increases, the tower is gradually becoming thicker and larger.

Such a tower may be installed by manufacturing pipe-shaped partition portions, divided into predetermined heights, and then transporting the same to a site, and being assembled by bolting. Therefore, each partition portion has a structure in which a flange is welded to a pipe.

During welding, in the flange, welding distortion occurs inwardly or outwardly thereof depending on excessive distortion during welding and shrinkage characteristics caused by welding. A thicker flange, much thicker than the pipe, may not be greatly distorted, but slight welding distortion may occur.

If welding distortion occurs in the flange, it is difficult to correct, and distortion exceeding a standard value may be secured through cutting. However, heavy equipment for moving heavy objects is required for cutting, and large cutting tools are also required for cutting. In addition, in order to secure a dimension of the flange, a thickness considering processing allowance, beyond structural strength, is applied.

Such correction by cutting reduces productivity, increases manufacturing period and costs, and becomes a factor in degrading the performance of the flange.

SUMMARY OF INVENTION

Technical Problem

An aspect of the present disclosure is to provide an apparatus for preventing welding distortion, capable of effectively reducing welding distortion of a flange, occurring during welding with a pipe and a method for welding a pipe and a flange using the same.

Solution to Problem

According to an aspect of the present disclosure, an apparatus for preventing welding distortion, may include: at least one counterweight disposed to be in contact with one side of a flange, to be welded to a pipe, and having a hollow portion therein; and a fastener fixing the counterweight to the flange, wherein the hollow portion of the counterweight may accommodate a refrigerant.

According to an aspect of the present disclosure, a method for welding a pipe and a flange, may include operations of: fixing a counterweight of the apparatus for preventing welding distortion according to any one of claims 1 to 5, to one side of a flange; and welding the flange to a pipe on the other side of the flange.

Advantageous Effects of Invention

According to the present disclosure, by reducing welding distortion of a flange, generated during welding of a thick flange and a relatively thin pipe in a welding operation, it is possible to improve productivity and reduce manufacturing period and costs.

BRIEF DESCRIPTION OF DRAWINGS

FIG. 5 are diagrams of analysis results comparing welding distortion for the method for welding a pipe and a flange according to the prior art and the present disclosure.

MODE FOR INVENTION

Figure 1:
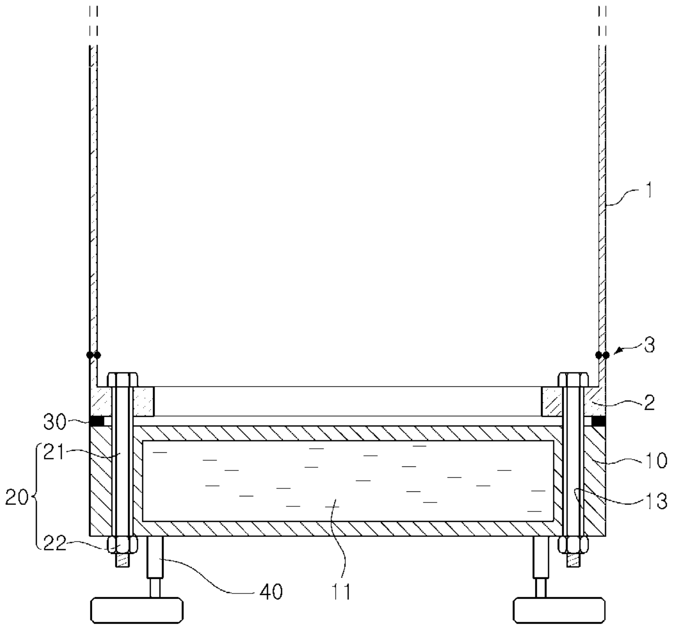
FIG. 1 is a front view illustrating an apparatus for preventing welding distortion according to an embodiment of the present disclosure.

Hereinafter, the present disclosure is illustrated in detail through exemplary drawings. In adding reference numerals to the components of each drawing, it should be noted that the same components have the same numerals as much as possible even if they are displayed on different drawings.

Figure 2:
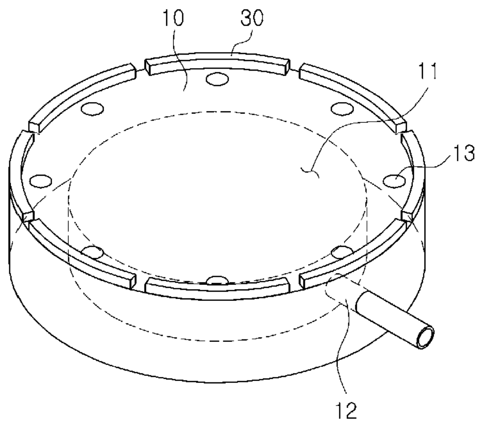
FIG. 2 is a perspective view of the counterweight illustrated in FIG. 1, and a dispositional relationship of a support may be seen.

FIG. 1 is a cross-sectional view illustrating an apparatus for preventing welding distortion according to an embodiment of the present disclosure, and FIG. 2 is a perspective view of the counterweight illustrated in FIG. 1, and a dispositional relationship of a support may be seen.

The apparatus for preventing welding distortion according to an embodiment of the present disclosure may include a counterweight 10 and a fastener 20.

The counterweight 10 is a substantially plate-shaped member having a predetermined thickness. The counterweight may have the same shape as a shape of a flange 2, to be welded to the pipe 1, that is, a donut-shaped cross-section, but an embodiment thereof is not necessarily limited thereto.

For example, the counterweight 10 may be formed not only in a donut shape, but also in a circular shape, an elliptical shape, or an arbitrary polygonal shape.

A weight of the counterweight 10 should be large enough to resist force, generated by shrinkage of a welded portion 3 between the flange 2 and the pipe 1.

In addition, the counterweight 10 may have a hollow portion 11 capable of accommodating a refrigerant therein. In order to inject or discharge the refrigerant, a flow path communicating the hollow portion and an external side may be formed in the counterweight, and a cock or valve (not shown) may be mounted on one side of the flow path.

The refrigerant may be simply accommodated and stored in the hollow portion 11 through the flow path 12, or when a plurality of passages are provided, the refrigerant can be circulated after being cooled outside the counterweight 10 through an inside of the hollow portion.

The counterweight 10 may be formed of a material through which heat of the flange 2 may be transferred. To this end, the counterweight may be formed of at least the same material as a flange, to be welded, but an embodiment thereof is not necessarily limited thereto.

For example, the counterweight 10 may be formed of a material having higher thermal conductivity than that of the material of the flange so that the heat generated when the flange 2 is welded to the pipe 1 may be smoothly transferred.

The refrigerant accommodated in the hollow portion 11 of the counterweight 10 may cool the heat conducted from the flange 2. For example, a liquid refrigerant such as water may be employed, but any other cooling gas may be used as a refrigerant.

An amount of refrigerant accommodated in the hollow portion 11 of the counterweight 10 may be determined so that a temperature of the refrigerant is not raised to 50° C. or higher than a temperature before heat input by the heat transferred by setting twice the total heat input as a minimum value during welding.

As a result, the heat generated during welding between the flange 2 and the pipe 1 is conducted toward the flange, and then transferred toward the counterweight 10, disposed in contact with the flange, and at the same time,] welding heat is rapidly cooled by the refrigerant in the counterweight.

Meanwhile, although an example in which one counterweight 10 is disposed is illustrated in FIG. 1, an embodiment thereof is not limited thereto. For example, after a plurality of counterweights are stacked and the flange 2 is disposed on the uppermost counterweight, all thereof may be integrally coupled by the fastener 20.

In addition, FIGS. 1 and 2 illustrate an example in which the flange 2 protrudes radially inwardly of the pipe 1, but an embodiment thereof is not limited thereto, for example, the flange protrudes radially outwardly of the pipe, and the counterweight 10 may be configured to have an appropriate outer diameter or width accordingly.

The fastener 20 is a means for fixing the counterweight 10 to a flange 2, to be welded to the pipe 1, and may include, for example, a bolt 21, a nut 22, a washer, and the like.

However, a shape of the fastener is not necessarily limited thereto, and any other mechanical fastening means may be employed, of course, as long as the counterweight may be firmly fastened to a flange surface of the flange.

A plurality of through-holes 13 for installing the fastener 20 may be formed in the counterweight 10. These through-holes may be disposed so as not to interfere with the hollow portion 11 of the counterweight.

Optionally, a support 30 may be further included between the counterweight 10 and the flange 2, to apply distortion in advance in a direction opposite to a contraction direction in consideration of the contraction distortion due to welding of the flange.

The support 30 is a member formed to have an arc shape with a substantially rectangular cross-section, and a material thereof is not particularly limited, but may be formed of, for example, a metal such as steel in consideration of durability for reuse, or the like.

As illustrated in FIG. 2, a plurality of supports 30 may be disposed around the through-hole 13 of the counter weight 10 in a circumferential direction in a circumferential front end of the counterweight. When the counterweight 10 and the flange 2 are fastened with the fastener 20 after being disposed in this manner, the support may impart distortion to the flange 2.

In this case, a thickness of the counterweight 10 may be at least 1.2 times greater than a thickness of the flange 2. Accordingly, it is possible to prevent the counterweight 10 from being rather distorted when the flange is distorted in advance by fastening with the fastener 20.

If the flange 2 is distorted by about 1 mm in advance and then welded by applying tension force (tensile force with the fastener), the distortion of the flange may be reduced with high precision even if the flange is cooled and contracted after welding.

An amount of distortion is not large because the thickness of the flange 2 is thick, but if welding is performed in a state in which slight distortion and tension force (tensile force by the fastener) are applied, welding distortion due to contraction during a heat input process may be offset.

In addition, when welding is performed in a circumferential direction between the flange 2 and the pipe 1, the flange may be differently distorted in an axial direction (in the same direction as the axial direction of the pipe), and when a support 30 is used, an advantage of exhibiting a constant distortion behavior over the circumferential direction of the flange may be obtained.

Incidentally, the support 30 also has an advantage of further improving heat conduction between the counterweight 10 and the flange 2 due to thermal conductivity of a material thereof.

In the present specification and drawings, the support 30 is illustrated and described as having a divided arc shape, but an embodiment thereof is not necessarily limited thereto, and the support may be formed in, for example, a continuous ring shape.

Hereinafter, a method for welding a pipe and a flange using the apparatus for preventing welding distortion, configured as described above will be described.

Figure 3:
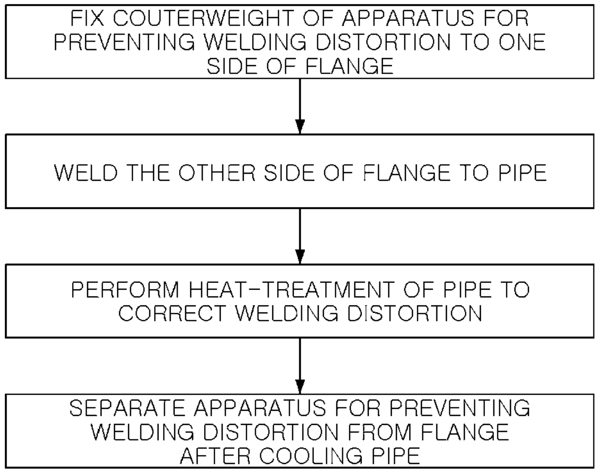
FIG. 3 is a flowchart schematically illustrating a method for welding a pipe and a flange according to an embodiment of the present disclosure.

FIG. 3 is a flowchart schematically illustrating a method for welding a pipe and a flange according to an embodiment of the present disclosure.

In order to reduce welding distortion of a thick flange 2 during welding, an apparatus for preventing welding distortion is installed on a flange. More specifically, a counterweight 10 for restraining a flange surface is installed on the flange surface of the flange before welding.

For example, at least one counterweight 10 is put on a support jig 40, a flange 2, to be welded is put thereon, and then the flange and the counterweight (s) are fastened and fixed by a fastener 20.

When the fastener 20 includes, for example, a bolt 21, a nut 22, and the like, the bolt may be inserted so as to penetrate through a bolt hole of the flange 2 and a through-hole 13 of the counterweight 10, and the nut may be fastened to an end portion of the bolt.

Optionally, a support 30, imparting distortion to the flange in advance in a direction opposite to a contraction direction, may be interposed between the counterweight 10 and the flange 2.

As a result, between the flange 2 and the counterweight 10 may be firmly fixed, and the counterweight may restrain distortion of the flange during welding between the flange 2 and the pipe 1, to be performed thereafter. Accordingly, force generated by the contraction of the welded portion 3 occurs on a side of the pipe, thinner than the flange.

When welding the thick flange 2 and the pipe 1, X-type improvement is normally applied to the welded portion 3. However, the X-type improvement has a high possibility of welding distortion due to a large amount of welding, and it is necessary to reduce the amount of welding to reduce an amount of welding deformation.

In the method for welding a pipe and a flange according to an embodiment of the present disclosure, the amount of welding distortion may be reduced by applying Y-type improvement to the welded portion 3 between the flange 2 and the pipe 1 so that less welding distortion occurs.

Figure 4:
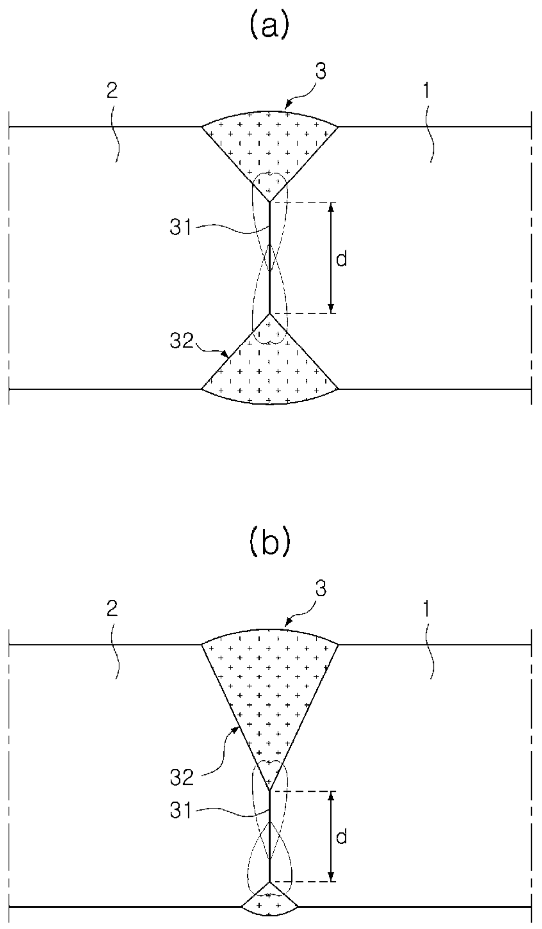
FIG. 4 are schematic views illustrating an improved shape for reducing welding distortion in the method for welding a pipe and a flange according to an embodiment of the present disclosure.

FIG. 4 is a schematic diagram illustrating an improved shape for reducing welding distortion in the method for welding the pipe and the flange according to an embodiment of the present disclosure.

As illustrated in FIG. 4, a smooth portion 31 in a central portion among improved shapes between a thick flange 2 and a pipe 1 may be penetrated with high heat input welding, and then an inclined portion 32 be penetrated with low heat input welding.

Welding between the flange 2 and the pipe 1 may be, for example, arc welding, electric resistance welding, or the like.

For example, when electric resistance welding is applied, the smooth portion 31 of the central portion among the improved shapes may be deeply penetrated with a direct current (DC) welding machine, and the inclined portion 32 may be welded with an alternating current (AC) welding machine.

As described above, in a welded portion 3, a high heat input welding section of the central portion, that is, the smooth portion 31 is a neutral axis portion of the cross-section, and welding distortion due to shrinkage does not occur significantly. It is recommended that a radial length (d) of the smooth portion not exceed 30 mm.

When welding proceeds in a state in which the thick flange 2 is constrained by a counterweight 10 of the apparatus for preventing welding distortion, the welding distortion easily occurs on a side of a pipe 1, thinner than the flange due to contraction and expansion of the welded portion 3.

The pipe 1, thinner than the flange 2, is first distorted due to a difference in rigidity with the flange, and since a degree of the distortion is not large, a lot of force stress remains.

In a method for welding a pipe and a flange according to an embodiment of the present disclosure, residual stress and residual distortion can be corrected by a heat treatment.

After the welding is finished, in order to correct the welding distortion generated in the pipe 1, a peripheral portion of the welded portion 3 of the pipe is evenly heated in a circumferential direction, thereby reducing the distortion and tension generated during welding.

The heat treatment may be performed on a portion of the pipe, spaced apart from the welded portion 3, by approximately 10 mm to an opposite side of the flange 2. Further, a maximum temperature of the heat treatment is 500° C. on a surface of the pipe 1, and the heating of the pipe is preferably controlled so as not to exceed 500° C.

Correction by the heat treatment may be implemented by using various heaters such as a gas burner, an electric heating wire, a ceramic heating pad, and the like.

In the method for welding a pipe and a flange according to an embodiment of the present disclosure, in a state in which the flange 2 is restrained by a counterweight 10 of the apparatus for preventing welding distortion, a surface of the pipe 1 is evenly expanded and contracted by a heater, rotating and heating constantly in a circumferential direction, out-of-plane distortion, generated on a side of the pipe, may be constantly corrected in the circumferential direction, and tension force may be relieved while being slowly cooled to room temperature.

When the correction by the heat treatment is completed and the cooling to room temperature is completed, the apparatus for preventing welding distortion including the counterweight 10 is separated from the flange 2.

FIG. 5 is a diagram of analysis results comparing welding distortion for the method for welding a pipe and a flange according to the prior art and the present disclosure.

FIG. 5 illustrates welding distortion (a) of a flange welded without restraint according to the prior art and a distortion reduction effect (b) of a flange welded with restraint with a counterweight according to the present disclosure by numerical analysis.

In other words, in (a) of FIG. 5, welding distortion occurs in a flange 2, and in (b) of FIG. 5, it can be clearly seen that welding distortion mainly occurs in a pipe 1, rather than the flange.

As described above, according to the present disclosure, welding distortion of the flange, generated when welding a thick flange and a relatively thin pipe may be reduced in a welding operation by changing the restraint and improvement shape of the flange, and the welding distortion, generated in the pipe may be corrected by a heat treatment, thereby improving productivity and reducing manufacturing period and costs.

While example embodiments have been shown and described above, it will be apparent to those skilled in the art that modifications and variations could be made to those skilled in the art without departing from the scope of the present disclosure as defined by the appended claims.

For example, in the present specification and drawings, an example in which the flange and the pipe are welded while the counterweight, the flange, and the pipe are disposed in a vertical state is illustrated and described, but an embodiment thereof is not necessarily limited thereto, and the flange and the pipe may be welded while the counterweight, the flange, and the pipe are disposed in a horizontal state.

Therefore, the embodiments disclosed in this specification and drawings are not intended to limit the technical spirit of the present invention, but to explain, and the scope of the technical spirit of the present invention is not limited by these embodiments. The protection scope of the present invention should be construed according to the claims below, and all technical ideas within the equivalent range should be construed as being included in the scope of the present invention.

DESCRIPTION OF REFERENCE NUMERALS

| | |
|---|---|
| 1: PIPE | 2: FLANGE |
| 3: WELDED PORTION | 10: COUNTERWEIGHT |
| 11: HOLLOW PORTION | 12: FLOW PATH |
| 13: THROUGH-HOLE | 20: FASTENER |
| 21: BOLT | 22: NUT |
| 30: SUPPORT | 40: ZIG |
| 31: SMOOTH PORTION | 32: INCLINED PORTION |

The invention claimed is:

1. An apparatus for preventing welding distortion, comprising:

at least one counterweight disposed to be in contact with one side of a flange, to be welded to a pipe, and having a hollow portion therein;

a fastener fixing the counterweight to the flange; and a support interposed between the counterweight and the flange to impart distortion to the flange when fastened by the fastener, wherein the support is disposed in a circumferential direction in a circumferential front end of the counterweight, and wherein the hollow portion of the counterweight accommodates a refrigerant.

2. The apparatus for preventing welding distortion of claim 1, wherein a flow path communicating the hollow portion and external portions in the counterweight, in order to inject or discharge the refrigerant.

3. The apparatus for preventing welding distortion of claim 1, wherein the counterweight is formed of the same material as the flange, or a material having higher thermal conductivity than that of the material of the flange.

4. The apparatus for preventing welding distortion of claim 1, wherein a plurality of through-holes for installing the fastener are formed in the counterweight.

5. A method for welding a pipe and a flange, comprising operations of:

fixing a counterweight of the apparatus for preventing welding distortion according to claim 1, to one side of a flange, the fixing operation including an operation of imparting distortion to the flange by interposing a support between the counterweight and the flange; and welding the flange to a pipe on the other side of the flange, wherein the support is interposed between the counterweight and the flange to impart distortion to the flange in a direction opposite to a contraction direction in advance when fastened by the fastener, and wherein the support is disposed in a circumferential direction in a circumferential front end of the counterweight.

6. The method for welding a pipe and a flange of claim 5, wherein, when the flange and the pipe are welded, Y-type improvement is applied.

7. The method for welding a pipe and a flange of claim 6, wherein, among the Y-type improvements, high heat input welding is performed on a smooth portion of a central portion, as compared to an inclined portion thereof.

8. The method for welding a pipe and a flange of claim 7, wherein a radial length of the smooth portion does not exceed 30 mm.

9. The method for welding a pipe and a flange of claim 5, further comprising:

an operation of performing a heat-treatment of the pipe to correct welding distortion, generated in the pipe, after the welding operation is completed.

10. The method for welding a pipe and a flange of claim 9, wherein the operation of performing the heat-treatment is performed for the pipe in an opposite side of the flange in a welded portion, and heating is controlled so that a maximum temperature on a surface of the pipe does not exceed 500° C.

11. The method for welding a pipe and a flange of claim 9, further comprising operations of:

cooling the pipe when the operation of performing the heat-treatment is completed; and separating the apparatus for preventing welding distortion from the flange.

* * * * *